United States Patent
Tanaka et al.

(10) Patent No.: US 7,499,635 B2
(45) Date of Patent: Mar. 3, 2009

(54) IMAGE PICKUP APPARATUS INCORPORATING SHAKE CORRECTION

(75) Inventors: Yoshiharu Tanaka, Kawachinagano (JP); Yasuhiro Hirose, Kobe (JP); Yoshiyuki Inoue, Izumi (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 422 days.

(21) Appl. No.: 11/220,480

(22) Filed: Sep. 7, 2005

(65) Prior Publication Data
US 2006/0056830 A1 Mar. 16, 2006

(30) Foreign Application Priority Data
Sep. 10, 2004 (JP) ............................. 2004-264448

(51) Int. Cl.
*G03B 17/00* (2006.01)
(52) U.S. Cl. .................. 396/55; 348/208.4; 348/208.7; 348/208.11; 348/319.1; 33/1 M
(58) Field of Classification Search .................. 396/55; 348/208.4, 208.7, 208.11, 219.1; 33/1 M
See application file for complete search history.

(56) References Cited

U.S. PATENT DOCUMENTS

| | | | | |
|---|---|---|---|---|
| 4,119,982 A | * | 10/1978 | Imura et al. ................. 396/354 |
| 5,218,442 A | * | 6/1993 | Hamada et al. ........ 348/208.15 |
| 5,890,018 A | * | 3/1999 | Terui ............................ 396/53 |
| 6,987,529 B1 | * | 1/2006 | Ito ........................... 348/208.2 |
| 2002/0146245 A1 | * | 10/2002 | Masuda ........................ 396/50 |
| 2002/0163581 A1 | * | 11/2002 | Kitazawa et al. ......... 348/208.6 |
| 2004/0090532 A1 | * | 5/2004 | Imada ................... 348/208.16 |
| 2005/0057660 A1 | * | 3/2005 | Nonaka et al. ......... 348/208.99 |
| 2005/0276590 A1 | * | 12/2005 | Ishikawa et al. .............. 396/55 |
| 2006/0017818 A1 | * | 1/2006 | Enomoto ................. 348/219.1 |

FOREIGN PATENT DOCUMENTS

| | | |
|---|---|---|
| JP | 2000-069353 A | 3/2000 |
| JP | 2003-222923 A | 8/2003 |

* cited by examiner

*Primary Examiner*—W. B. Perkey
*Assistant Examiner*—Warren K Fenwick
(74) *Attorney, Agent, or Firm*—Brinks Hofer Gilson & Lione

(57) ABSTRACT

An imaging apparatus of the invention includes an image pickup device for picking up object light; a mirror section for switching an optical path of the object light; a retaining member for retaining at least the mirror section; and a shake detection section for detecting a shake of the image pickup device. The shake detection section is provided in a member separate from but indirectly connected to the retaining member via a predetermined connection section.

16 Claims, 10 Drawing Sheets

(a)

(b)

IMAGE PICKUP APPARATUS INCORPORATING SHAKE CORRECTION

This application is based on Japanese Patent Application No. 2004-264448 filed in Japan on 10 Sep. 2004, the entire content of which is hereby incorporated by reference.

FIELD OF THE INVENTION

The present invention relates to an imaging apparatus such as a digital camera and, in particular, to an imaging apparatus provided with a shake correction mechanism for correcting a camera shake and a shake detecting mechanism for detecting the shake.

DESCRIPTION OF RELATED ART

In recent years, in some imaging apparatuses such as digital cameras, a high magnification zoom lens is incorporated that allows a single apparatus to cover a wide range of photographing. Especially in such cameras incorporating a high magnification zoom lens, a "shake" such as a camera shake immediately affects the photographing. Thus, some of such cameras employ a shake correction mechanism in which an image pickup device (image pickup sensor) such as a CCD is displaced (moved) in a direction approximately perpendicular to the optical axis depending on the amount of discrepancy in the incident light relative to the optical axis so that shake correction is achieved (see, for example, JP-A No. 2000-69353).

Such a digital camera comprises a shake detection section composed of a gyro sensor or the like and thereby detecting the direction of a shake and the amount of the shake on the basis of an angular velocity caused by a shake of the camera in the yaw direction or the pitch direction. Then, on the basis of the shake information detected by the shake detection section, shake correction drive is performed in the above-mentioned shake correction mechanism.

As described above, in the shake correction mechanism, the shake-responding moving operation performed in a direction approximately perpendicular to the optical axis of the image pickup device is achieved by a driving unit such as a moving coil and a piezoelectric actuator. Thus, a vibration caused by the driving of the shake correction mechanism can be transmitted to the shake detection section. Further, in the case that the digital camera is of a single lens reflex type, the camera comprises a movable mirror section for switching the optical path in a middle portion of the photographing optical system, where at the time of photographing, the mirror jumps upward and thereby allows the image pickup device to be exposed to the object light, while on completion of the photographing, the mirror returns to the original position and thereby reflects the object light toward the finder optical system. Thus, a vibration caused by the driving of the mirror section can be transmitted to the shake detection section.

As such, when the vibration caused by the driving of the shake correction mechanism, the mirror section, or the like is transmitted to the shake detection section, the vibration affects the shake correction (the shake angle cannot be detected accurately), and prevents accurate shake correction. This prevents photographing of a clear image which could be achieved by accurate shake correction.

SUMMARY OF THE INVENTION

The invention has been devised in view of the above-mentioned situation. An object of the invention is to provide an imaging apparatus in which a vibration caused by the driving of a shake correction mechanism, a mirror section, or the like is prevented from being directly transmitted to a shake detection section, so that an influence on the shake detection section in the shake detection section is minimized so that a clear photographed image is obtained on the basis of the shake correction.

This object is achieved by providing the following configuration.

An imaging apparatus of the invention comprises: an image pickup device for picking up object light; a mirror section for switching an optical path of the object light; a retaining member for retaining at least the mirror section; and a shake detection section for detecting a shake of the image pickup device, wherein the shake detection section is provided in a member separate from but indirectly connected to the retaining member via a predetermined connection section.

According to this configuration, the imaging apparatus comprises: the image pickup device for picking up object light; the mirror section for switching an optical path of object light; the retaining member for retaining at least the mirror section; and the shake detection section for detecting a shake of the image pickup device, wherein the shake detection section is provided in the member separate from but indirectly connected to the retaining member via the predetermined connection section. As such, the shake detection section is attached to the separate member (for example, a main body serving as a rigid body composed of an integration of structures other than a unit containing the retaining member retaining the mirror section; specifically, a battery unit in the main body) connected indirectly to the retaining member that retains the mirror section and hence receives directly a vibration at the time of driving of the mirror section (a vibration generated in each driving section in the apparatus is conveniently referred to as a drive vibration, hereafter) with the intervention of the connection section (such as a front chassis, a side chassis, a bottom chassis, and a screw joining these). This avoids that the vibration caused by the driving of the mirror section is directly transmitted to the shake detection section. That is, the vibration is bypassed and damped along a route going through the connection section. This minimizes the influence on the shake detection in the shake detection section. As a result, a clear photographed image is obtained on the basis of the shake correction.

In an example of the above-mentioned imaging apparatus, the shake detection section is provided in the separate member via a predetermined buffer member.

According to this configuration, since the shake detection section is provided in the separate member via the predetermined buffer member, the drive vibration of the apparatus is further damped in the buffer member. This suppresses more reliably the influence of the vibration on the shake detection in the shake detection section.

In an example of the above-mentioned imaging apparatus, the buffer member is composed of a sheet shaped rubber material.

According to this configuration, since the buffer member is composed of the sheet shaped rubber material, an easy attaching method is permitted such that the shake detection section is adhered to the separate member by means of adhesive applied on the two sides of the sheet. Further, this avoids the necessity of providing a special structure for absorbing the vibration, and permits the use of a buffer member having a simple configuration.

In an example of the above-mentioned imaging apparatus, the image pickup device is provided in the retaining member in the form of a shake correction unit that allows the image pickup device to move in a direction perpendicular to the optical axis and thereby permits the shake correction.

According to this configuration, the image pickup device is provided in the retaining member in the form of the shake correction unit that allows the image pickup device to move in a direction perpendicular to the optical axis and thereby permits the shake correction. This avoids that a vibration caused by the driving of the shake correction unit is directly transmitted to the shake detection section (the vibration is received immediately by the retaining member in which the shake correction unit is provided). That is, the vibration is bypassed and damped along a route going through the connection section. This minimizes the influence of the vibration on the shake detection in the shake detection section.

In an example of the above-mentioned imaging apparatus, the connection section is composed of a chassis and a screw for connecting the retaining member with the separate member by screw joining.

According to this configuration, the connection section is composed of the chassis and the screw for connecting the retaining member with the separate member by screw joining. This simple configuration damps the vibration, and allows the retaining member to be reliably connected and fixed to the separate member.

In an example of the above-mentioned imaging apparatus, the separate member is a battery unit fixed to the retaining member with predetermined spacing via a connection section.

According to this configuration, the separate member is the battery unit fixed to the retaining member with predetermined spacing via the connection section. Thus, the separation from the retaining member with spacing avoids that the vibration is transmitted to the separate member (battery unit) to which the shake detection section is attached, via a route other than the route going through the connection section (such as via a part in contact with the retaining member, if any). Further, the separate member is a unit serving as a battery accommodating section, and hence generates no vibration. This suppresses more reliably the influence of the vibration on the shake detection in the shake detection section.

BRIEF DESCRIPTION OF THE DRAWINGS

These and other objects and features of the present invention will become clear from the following description taken in conjunction with the preferred embodiments thereof with reference to the accompanying drawings, in which:

FIG. 1(a) is an external front view of the digital camera, while FIG. 1(b) is an external rear view of the digital camera.

DETAILED DESCRIPTION OF THE PREFERRED EMBODIMENTS

Embodiments of the invention are described below with reference to the drawings.

(Description of Camera Appearance Configuration)

Figure 1:
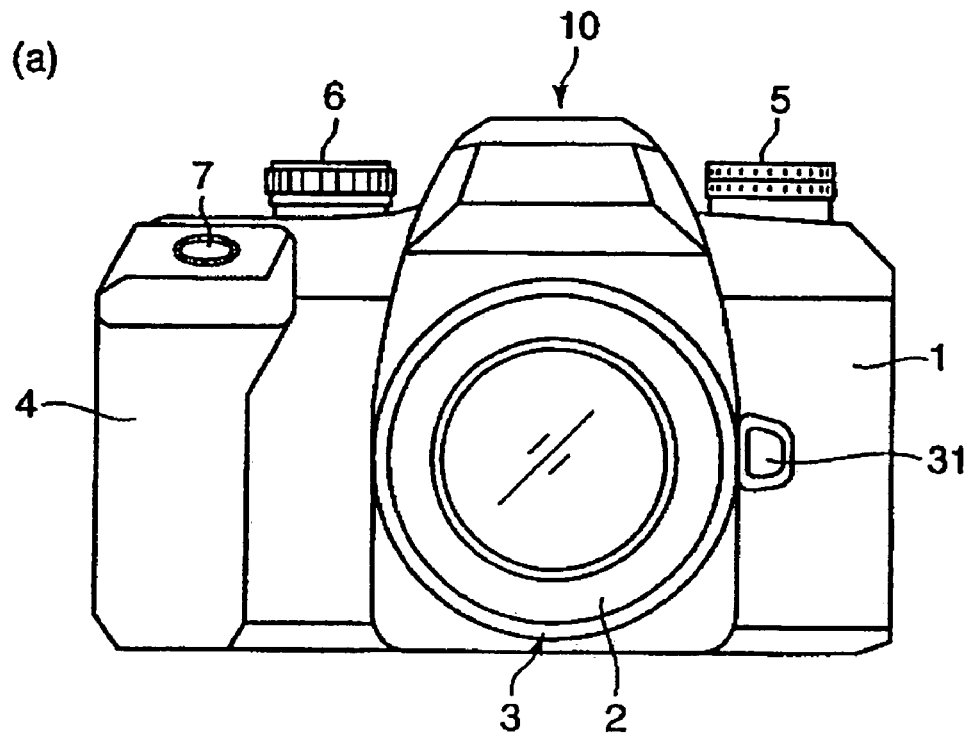
FIG. 1 is a diagram describing the appearance structure of a digital camera serving as an example of an imaging apparatus according to the invention.
Figure 1:
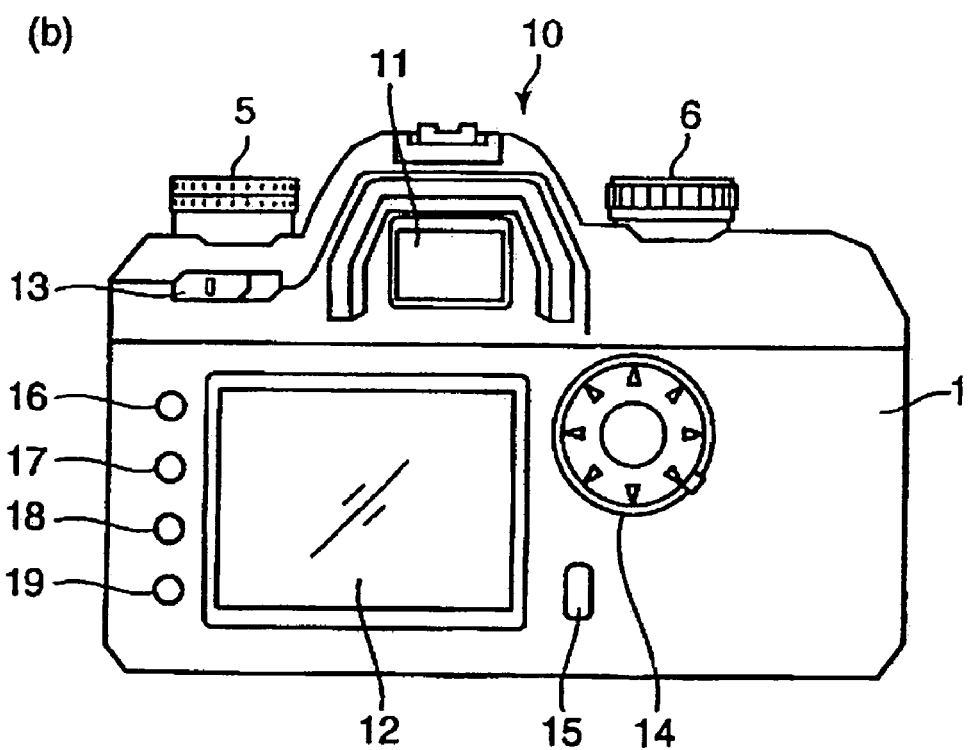

FIG. 1 is a diagram describing the appearance structure of a digital camera serving as an example of an imaging apparatus according to the invention. FIG. 1(a) is an external front view of the digital camera, while FIG. 1(b) is an external rear view of the digital camera. As shown in FIG. 1(a), the digital camera 10 is a single lens reflex type digital still camera comprising: a camera body 1; and a taking lens 2 (interchangeable lens) attached to an approximate center of the front face of the camera body 1 in an attachable and detachable (interchangeable) manner.

In FIG. 1(a), the camera body 1 comprises: a mount section 3 which is located in an approximate center of the front face, and to which the taking lens 2 is attached; a grip section 4 protruding in a front left end part and thereby permitting a user to grip (retain) the camera reliably by one hand (or two hands); a control value setting dial 5 located in a front upper right part and setting a control value; a mode setting dial 6 located in a front upper left part and switching a photographing mode; and a release button 7 located in an upper face of the grip section 4 and instructing the start and/or stop of a photographing operation (exposure).

The taking lens 2 serves as a lens window for acquiring light (an optical image) from a photographic object, and further constitutes a taking lens system (such as a zoom lens block and a fixed lens block arranged in series along the optical axis) for leading the light to an image pickup device 101 and a finder section 102 arranged inside the camera body 1 as described later. In the taking lens 2, each lens position can be moved manually or automatically so that the focusing can be adjusted.

Provided near the mount section 3 are: an attaching and detaching button 31 for attaching and detaching the taking lens 2; a plurality of electrical contacts (omitted in the figure) for establishing electrical connection to the attached taking lens 2; and a plurality of couplers (omitted in the figure) for establishing mechanical connection. These electrical contacts are used for transmitting characteristic information of the lens (information such as the open F value and the focal length) from a lens ROM (read-only memory) built in the taking lens 2 to a system control section 100 (control board 140) inside the camera body 1 as described later, or alternatively for transmitting the position of the focus lens or the position of the zoom lens in the taking lens 2 to the system control section 100. The coupler transmits a driving force of a focus lens driving motor provided in the camera body 1 to each lens in the taking lens 2.

The mode setting dial 6 is used for setting various photographing modes including: an automatic exposure (AE) control mode or an automatic focusing (AF) control mode; a static image photographing mode for taking a still image or a video shooting mode for shooting a video (continuous photographing mode); and a flash mode.

The release button 7 is a push switch permitting: an operation where the switch is pushed halfway into a "half push state" and; an operation where the switch is pushed further into a "full push state". In the static image photographing mode, when the release button 7 is pushed halfway, a preparation operation (preparation operation such as the setup of an exposure control value and the focusing adjustment) is performed for taking a still image of a photographic object. When the release button 7 is fully pushed, a photographing operation (a series of operation including: exposure in an image pickup device described later; predetermined image processing on the image signal acquired in the exposure; and data recording into a memory card) is performed. In the video shooting mode, when the release button 7 is fully pushed, a shooting operation (a series of operation similar to the above-mentioned one including: exposure in the image pickup device; image processing on the image signal acquired in the exposure; and recording of the image-processed image data into the memory card) is started. Then, when the release button 7 is fully pushed again, the shooting operation is stopped.

In FIG. 1(b), a finder window 11 (ocular section) is provided in an approximate upper center of the rear face of the camera body 1. An object image is led from the taking lens 2 to the finder window 11. Thus, a user (photographing person) looks through the finder window 11, so that the photographic object can be recognized visually. An external display section 12 (LCD; liquid crystal display monitor) is provided in an approximate center of the rear face of the camera body 1. In the present embodiment, the external display section 12 is composed of a color liquid crystal display device having a pixel number of 400(X direction)×300(Y direction)=120000, and displays the above-mentioned video image. The external display section 12 also displays a menu screen for setting up a mode concerning the AE control or the AF control, a mode concerning the photographing scene, a photographing condition, or the like. Further, in the reproduction mode, the external display section 12 reproduces and displays a taken image recorded in the memory card.

A power switch 13 is provided on the upper left of the external display section 12. The power switch 13 is composed, for example, of a two-position slide switch. When the contact is set into an "OFF" position on the left, the power goes OFF. When the contact is set into an "ON" position on the right, the power goes ON. On the right-hand side of the external display section 12, a direction selection key 14 and a camera shake correction switch 15 are provided. The direction selection key 14 has a circular manual operation button. In the manual operation button, detected are: push operations in the four directions of up, down, right, and left; and push operations in the four directions of upper right, upper left, lower right, and lower left. The direction selection key 14 is multi-functionalized. That is, for example, the direction selection key 14 serves as an operation switch for changing an item selected in the menu screen for photographing scene setup displayed on the external display section 12. The direction selection key 14 serves also as an operation switch for changing a frame of reproduction target selected in an index screen where a plurality of thumbnail images are displayed in an array format. Further, the direction selection key 14 can serve also as a zoom switch for changing the focal length of the zoom lens of the taking lens 2.

The camera shake correction switch 15 is used for setting up a shake correction mode for permitting reliable photographing in the case of possible occurrence of a "shake" such as a camera shake in the situation of hand-held photographing, telescope photographing, or dark-site photographing (requiring a long time exposure). The camera shake correction switch 15 may be composed of a two-position slide switch similar to the power switch 13.

On the left of the external display section 12, switches are provided that is used for performing operations concerning the display and the display contents of the external display section 12. These switches include: a cancellation switch 16, a confirmation switch 17, a menu display switch 18, and an external display changing switch 19. The cancellation switch 16 is a switch for canceling the contents selected in the menu screen. The confirmation switch 17 is a switch for confirming the contents selected in the menu screen. The menu display switch 18 is a switch for displaying the menu screen on the external display section 12 or for switching the contents (such as a photographing scene setting screen and an exposure control mode setting screen) of the menu screen. The menu screen is switched at each press of the menu display switch 18. The external display changing switch 19 is a switch for turning ON the display of the external display section 12 or for turning OFF the display. The display and the non-display of the external display section 12 are switched at each press of the external display changing switch 19. In addition to these switches, various switches such as a zoom switch, an exposure correction switch, and an AE lock switch each implemented by a push type switch or a dial type switch may be provided in an appropriate place of the camera body 1.

(Description of Camera Internal Configuration)

Next, the internal configuration of the digital camera 10 is described below.

Figure 2:
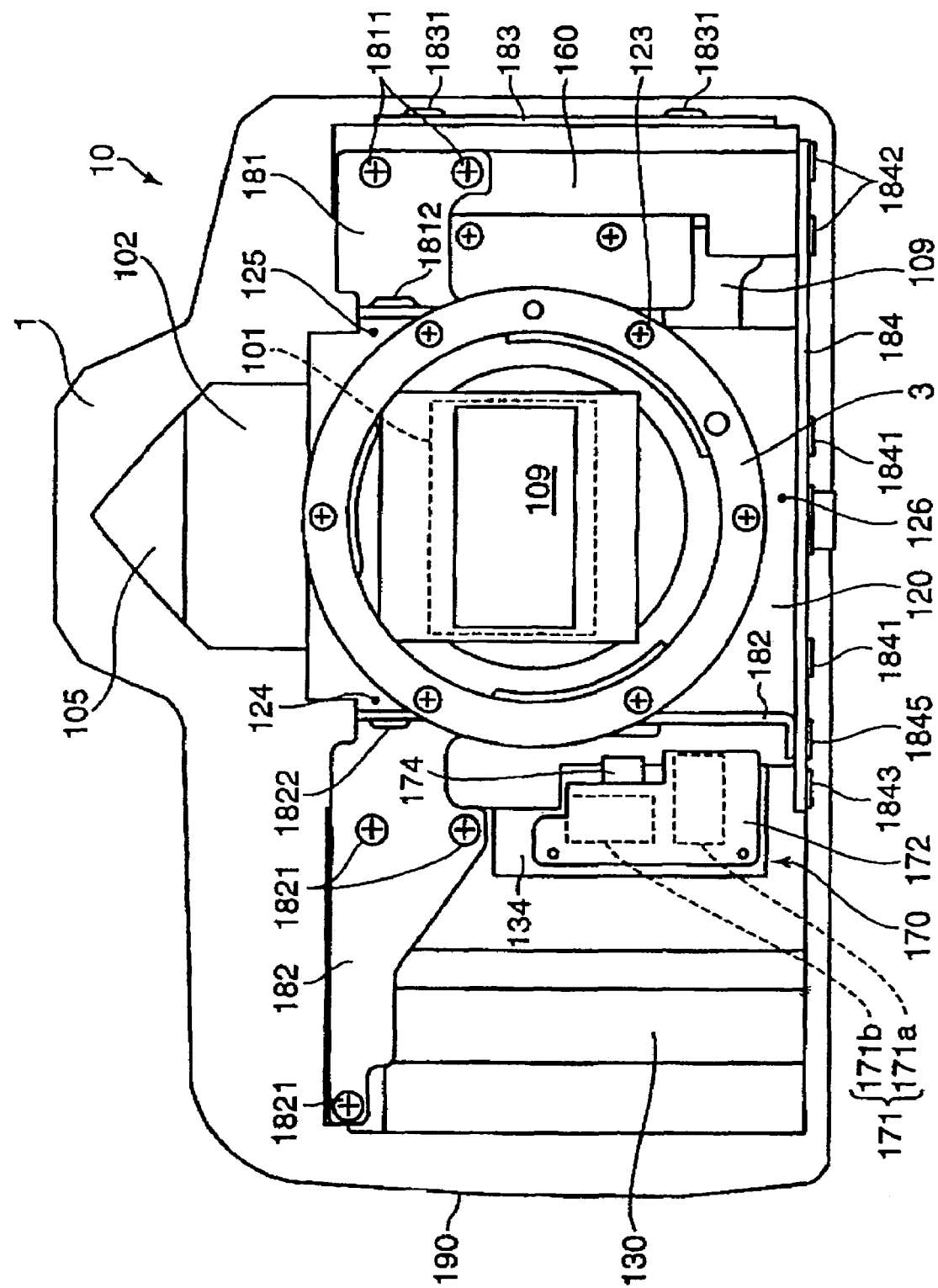
FIG. 2 is a front perspective view of a digital camera.
Figure 3:
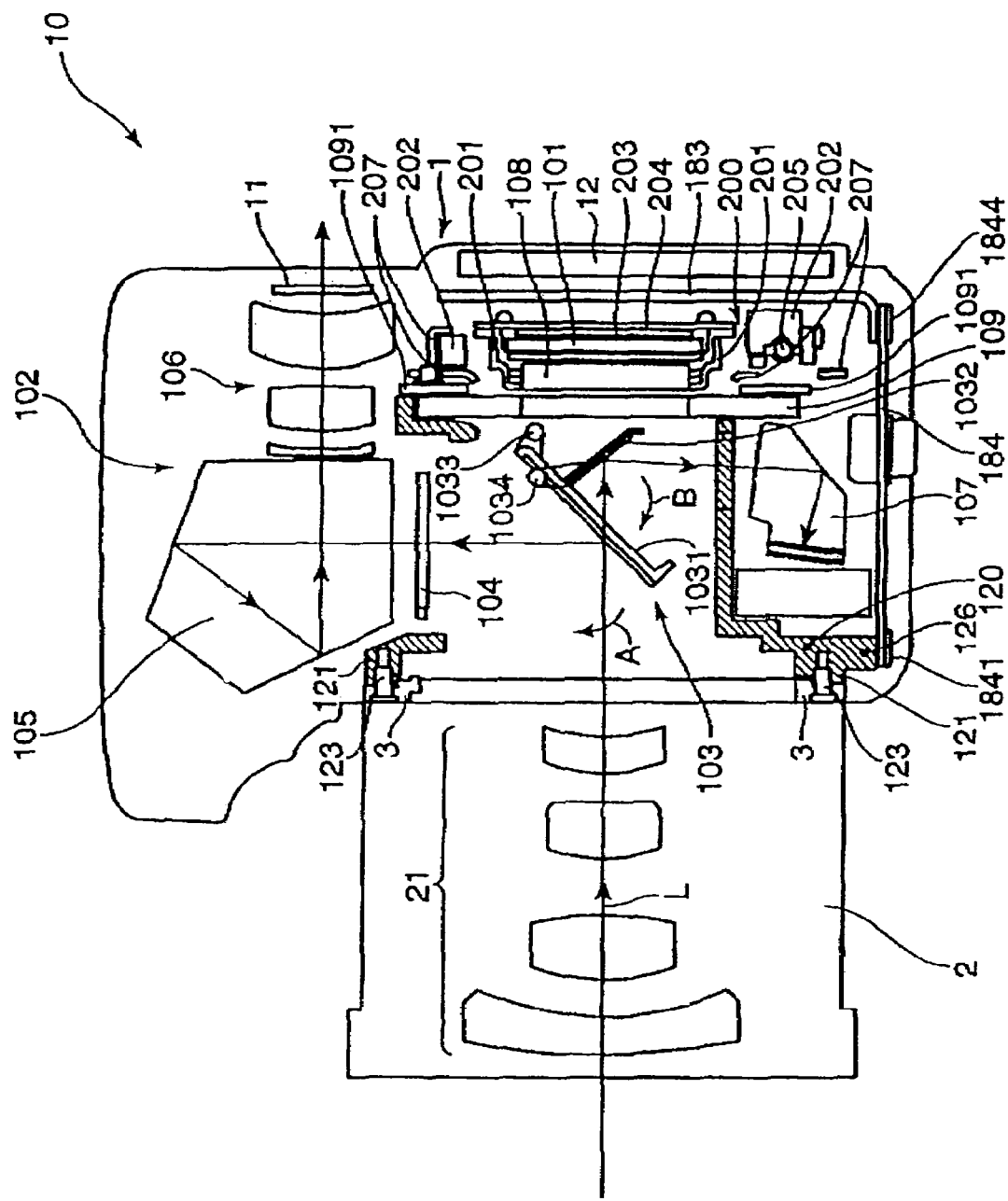
FIG. 3 is a side sectional view of a digital camera.
Figure 4:
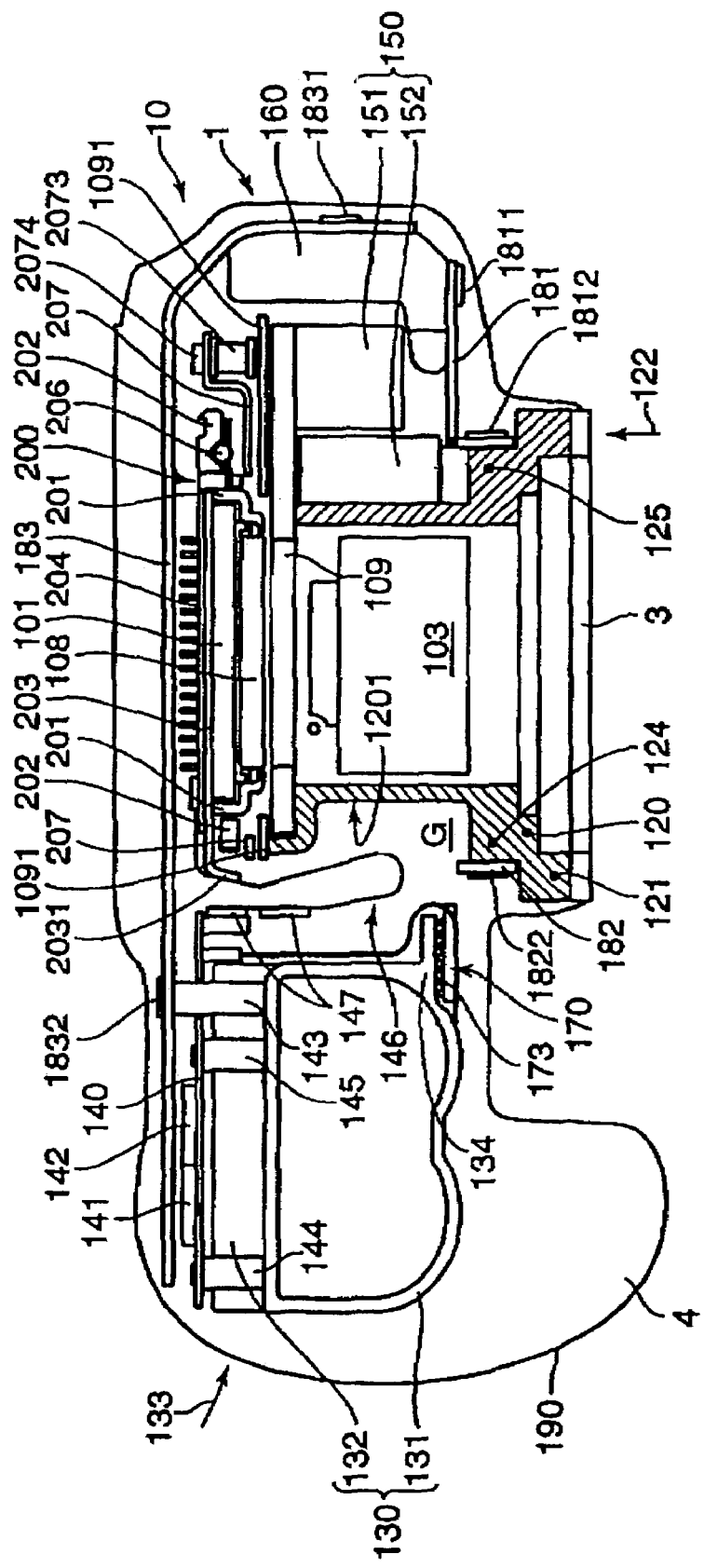
FIG. 4 is a top sectional view of a digital camera.

FIG. 2 is a front perspective view of the digital camera 10. FIG. 3 is a side sectional view of the digital camera 10, while FIG. 4 is a top sectional view of the digital camera 10. Here, FIGS. 2 and 4 are a perspective view and a sectional view showing the state that the taking lens 2 is removed. As shown in FIGS. 2-4, an image pickup device 101 having a rectangular shape is arranged at a position inside the camera body 1 opposing the taking lens 2, that is, at an appropriate position inside the camera body 1 on the optical axis L (see FIG. 3) of a lens group 21 provided in the taking lens 2 when the taking lens 2 is attached to the camera body 1, in a direction perpendicular to the optical axis L.

The image pickup device 101 detects the photographic object luminance (picks up the object light). That is, in response to the quantity of light of the photographic object optical image formed by the taking lens 2, the image pickup device 101 performs photoelectric conversion into image signals of R, G, and B components, and then outputs the signals to a control board 140 (image processing circuit 141) described later. Specifically, the image pickup device 101 comprises a single plate type color area sensor called a so-called Bayer method in which color filters of R (red), G (green), and B (blue) are adhered in a checkered pattern on to the surface of the CCD elements of the area sensor where the CCD (Charge Coupled Device) elements have been arranged in two dimensions. The image pickup device 101 has 1600(X direction)×1200(Y direction)=1920000 pixels. The image pickup device 101 may be a CCD image sensor, a CMOS image sensor, a VMIS image sensor, or the like. However, in the present embodiment, a CCD image sensor is adopted.

On the optical axis L, a mirror section 103 (reflecting plate) is arranged at a position appropriate for reflecting the object light toward the finder section 102 (finder optical system). The object light having passed through the taking lens 2 is reflected upward by the mirror section 103 (main mirror 1031 described later), and then image-formed on the reticle 104 (focusing glass). A part of the object light having passed through the taking lens 2 is transmitted through the mirror section 103.

The finder section 102 comprises a pentaprism 105, an ocular lens 106, and the above-mentioned finder window 11. The pentaprism 105 is a prism having a cross section of the shape of a pentagon, and generates an erect image from the photographic object optical image entered from the underside by inverting the top and bottom and the right and left of the image by means of internal reflection. The ocular lens 106 leads the object image converted into the erect image by the pentaprism 105, to the outside of the finder window 11. Such a configuration allows the finder section 102 to serve as an optical finder for checking the field of view at the time of photographing standby.

The mirror section 103 comprises a main mirror 1031 and a sub-mirror 1032. On the rear side of the main mirror 1031, the sub-mirror 1032 is provided in a rotatable manner such as to be capable of falling toward the main mirror 1031 rear face. A part of the object light having been transmitted through the main mirror 1031 is reflected by the sub-mirror 1032. Then, the reflected object light enters into the focus detection section 107. The focus detection section 107 is a so-called AF sensor composed of a distance measuring element or the like for detecting the focusing information of the photographic object.

The above-mentioned mirror section 103 is a so-called quick return mirror. At the time of exposure, the mirror jumps upward as indicated by an arrow A around a revolving shaft 1033 serving as a pivot, and then stops at a position under the reticle 104. At that time, the sub-mirror 1032 rotates in a direction indicated by an arrow B relative to the rear face of the main mirror 1031 around the revolving shaft 1034 serving as a pivot. When the above-mentioned mirror section 103 stops at the position under the reticle 104, the sub-mirror 1032 goes into a folded state almost in parallel to the main mirror 1031. Thus, the object light from the taking lens 2 reaches the image pickup device 101 without being interrupted by the mirror section 103, so that exposure is performed in the image pickup device 101. On completion of the exposure, the mirror section 103 returns to the original position (position shown in FIG. 3).

Immediately before the optical axis direction of the image pickup device 101, a low pass filter 108 (optical filter) is arranged so as to prevent the occurrence of false color or color moire. Further, immediately before the low pass filter 108, a shutter section 109 is arranged. The shutter section 109 is controlled such as to be opened and closed at the time of exposure. In the present example, a vertical running focal-plane shutter is adopted. The front side of the shutter section 109 abuts against the rear end of a frame 120 described later, while the rear side is pressed by a shutter pressing plate 1091. The shutter pressing plate 1091 is fixed to the frame 120 with screws 1092 (see FIG. 7). As a result, the shutter section 109 is supported by the frame 120. Behind the image pickup device 101, the external display section 12 is arranged in parallel to the image pickup device 101 plane in a manner arranging a later-described side chassis 183 therebetween.

In cooperation with a slider 202 and actuators (a yaw direction actuator 205 and a pitch direction actuator 206) described later, the image pickup device 101 constitutes a shake correction unit 200 (camera shake mechanism) in which the actuators are driven on the basis of shake information detected by a gyroscope unit 170 described later and thereby causes the image pickup device 101 to slide in the up, down, right, or left direction so that shake correction is achieved. The structure and the operation of the shake correction unit 200 are described later in detail.

In FIG. 2, a frame 120 (front frame) is arranged in an approximate center of the camera body 1 behind the mount section 3 (shaded portions in FIGS. 3 and 4). The frame 120 is a rectangular tube having an approximately rectangular shape in the front view and having openings in the front and rear faces of the frame 120 as well as in an top face part opposing the above-mentioned pentaprism 105 (reticle 104). This frame 120 is composed of a metal rigid body having a strength against distortion or the like. In the front face of the frame 120, a cylindrical mount receptacle section 121 is provided that agrees with the shape of the mount section 3. The mount section 3 is fitted into the mount receptacle section 121, and then screwed from the front side as indicated by an arrow of numeral 122 (see FIG. 4) using a plurality of screws 123. Inside the frame 120, the mirror section 103 is arranged so that the frame 120 serves as a retaining member for the mirror section 103.

A battery chamber 131 is arranged on the left of the frame 120 (inside the grip section 4). The battery chamber 131 is composed of resin such as plastics. In the inside, a predetermined number of dry batteries of AA size or the like are accommodated as the operation power source of the digital camera 10. A card accommodating section 132 is provided behind the battery chamber 131. In the card accommodating section 132, a recording medium such as a memory card for recording the image data of a taken image is accommodated in an attachable and detachable manner. The memory card is inserted in a state that a card slot cover located at a side face position or the like of the grip section 4 indicated by numeral 133 is opened. The structure composed of the battery chamber 131 and the card accommodating section 132 is referred to as a battery unit 130, hereafter.

A control board 140 is arranged behind the battery unit 130 (card accommodating section 132). Electronic components such as an image processing circuit 141 (for example, an image processing ASIC) for performing predetermined signal processing (image processing) on the image data and a shake correction circuit 142 (for example, a shake correction ASIC) for controlling shake correction drive described later are mounted on the control board 140, so that the control board 140 serves as a board constituting a main control section 100 described later. The control board 140 is arranged at a position adjacent to the shake correction unit 200 in a direction of almost the same plane, and attached via the threaded sections 144 and 145 in a manner mounted on the battery unit 130 fixed to a later-described side chassis 183 via a connection section 143. The control board 140 and the image pickup device 101 are electrically interconnected through a first flexible wiring board 146.

A drive unit 150 for driving the mirror section 103 and the shutter section 109 is arranged at a position on the right-hand side of and adjacent to the frame 120. Specifically, the drive unit 150 comprises: a shutter driving section 151 for opening and closing the shutter section 109; and a mirror driving section 152 for driving the mirror section 103. Here, the mirror driving section 152 includes apart of the shutter driving section for driving the shutter. On the further right (outside) of the drive unit 150, a connector section 160 is arranged that serves as a structure comprising electrode holders such as a remote terminal and a USB terminal or a jack or the like of the AC power supply and that is composed of resin such as plastics.

A gyroscope unit 170 is provided at a predetermined position of the battery unit 130, for example, in a side wall part in the front of the battery chamber 131. The gyroscope unit 170 comprises a gyroscope section 171, a gyroscope board 172, a buffer material 173, and a flexible wiring board 174 for gyroscopes, and thereby serves as a section (shake detection section) for detecting shake information such as the direction and the amount of a shake of a measurement target section (the digital camera 10 or the camera body 1 in the present embodiment). The shake information detected in the gyroscope unit 170 is used for the control of the shake correction drive performed by the shake correction unit 200. The gyroscope section 171 comprises: a yaw direction gyroscope 171b for detecting the amount of a shake on the basis of the angular velocity of the shake of the digital camera 10 in the yaw direction; and a pitch direction gyroscope 171a for detecting the amount of a shake on the basis of the angular velocity of the shake in the pitch direction. The gyroscope may be, for example, of a type in which a voltage is applied to a piezoelectric element and thereby bringing the element into a vibrational state, while a distortion resulting from the Coriolis force generated when the angular velocity of a rotation is exerted on the piezoelectric element is picked up as an electric signal, so that the angular velocity is detected. The gyroscope section 171 is mounted on a gyroscope board 172. The gyroscope board 172 (that is, the gyroscope unit 170) is attached via a buffer material 173 to a planar gyroscope attaching section 134 formed in a side wall part of the battery unit 130.

The buffer material 173 avoids that the gyroscope section 171 performs erroneous detection of a vibration which could be caused if the operation vibration of the mirror section 103 were transmitted. The buffer material 173 maybe, for example, an isobutylene isoprene rubber sheet (planar) material having an adhesive layer on each side. The flexible wiring board 174 for gyroscopes electrically connects the gyroscope section 171 (the yaw direction gyroscope 171b and the pitch direction gyroscope 171a) with the control board 140.

The above-mentioned sections of the digital camera 10 are connected (fixed) with each other through a chassis section 180 composed of a metallic material such as iron. In the present embodiment, the chassis section 180 comprises front chassis 181 and 182, a side chassis 183 (rear chassis), and a bottom chassis 184 (bottom plate).

Figure 5:
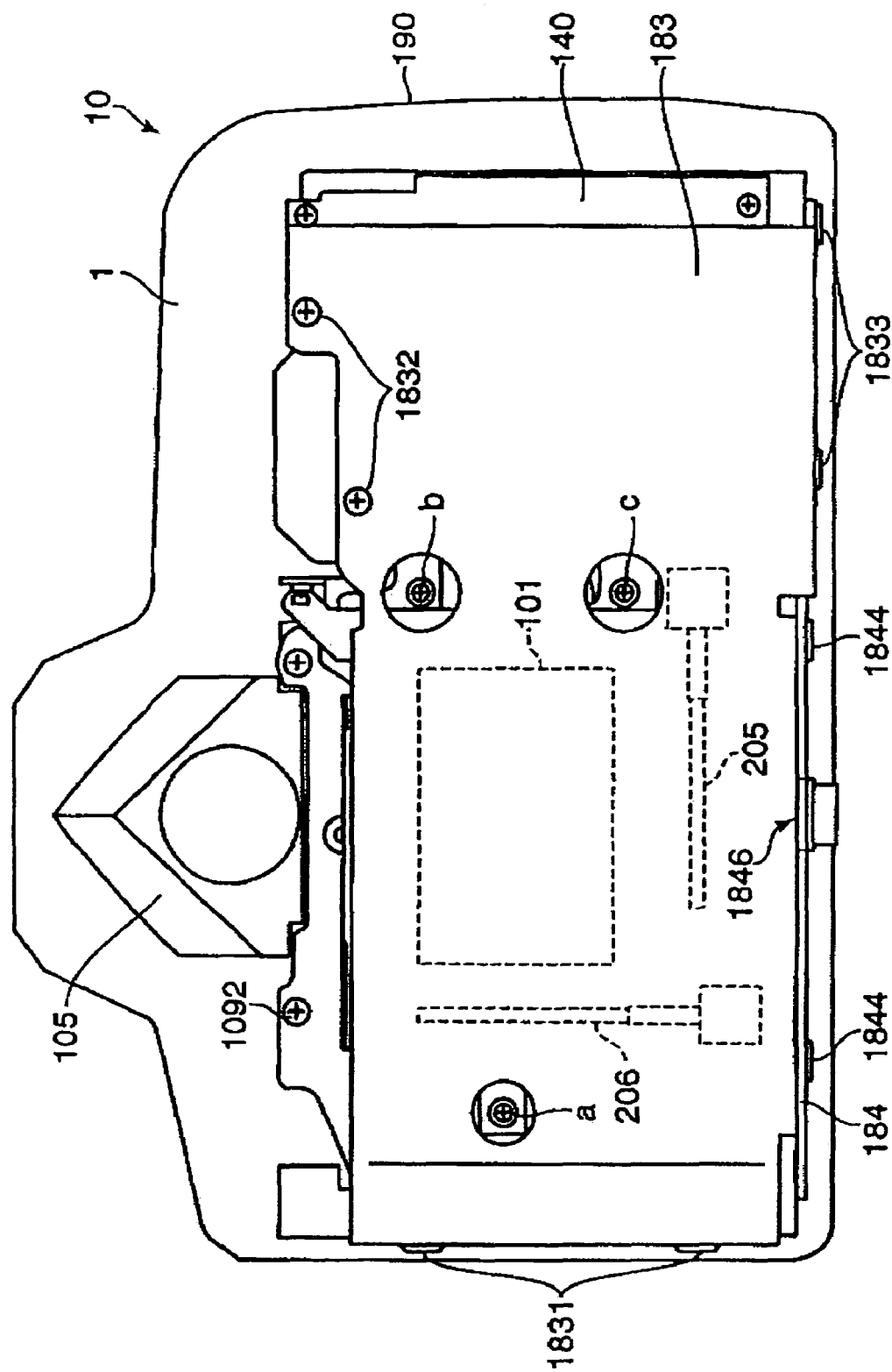
FIG. 5 is a rear perspective view of a digital camera.
Figure 6:
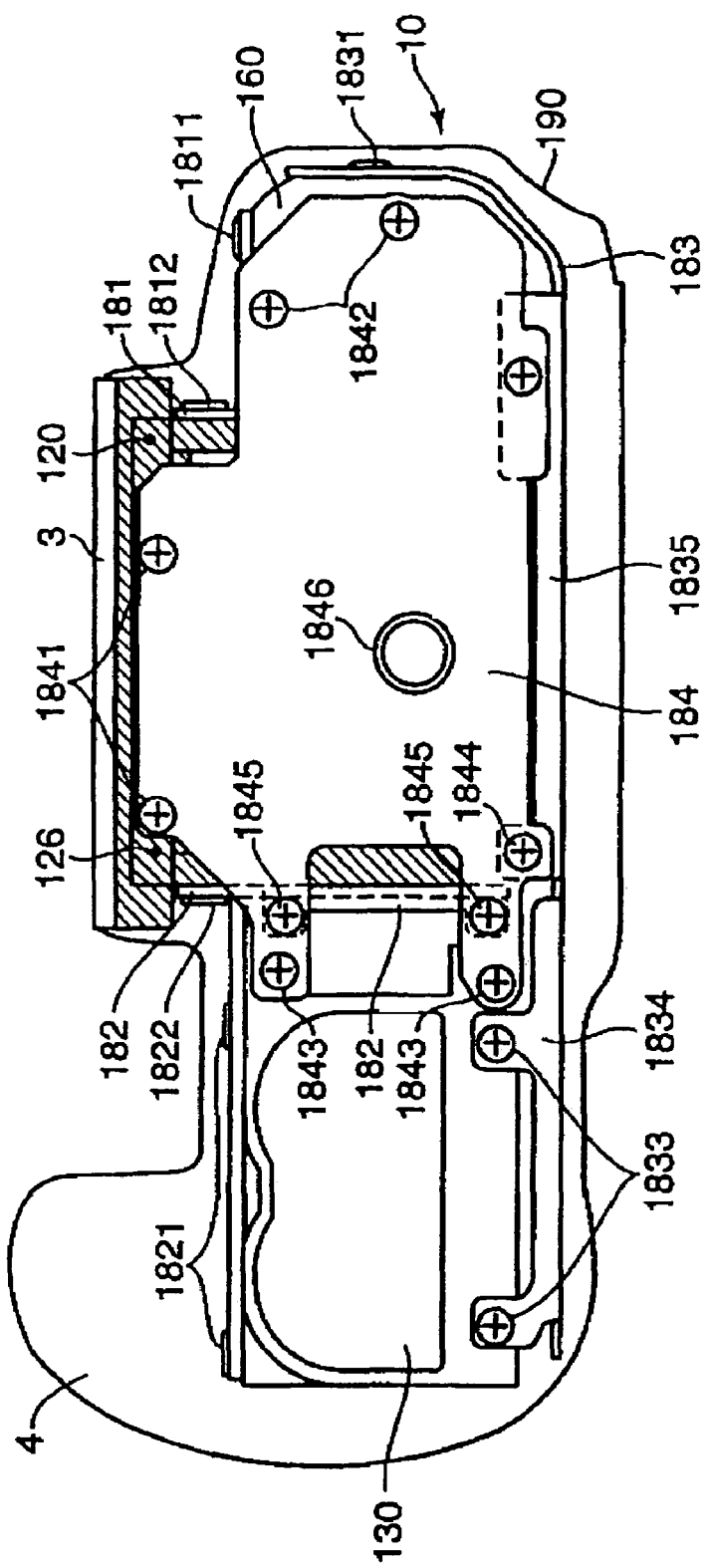
FIG. 6 is a bottom perspective view of a digital camera.

The connection achieved by these chassis is described below with reference to FIGS. 5 and 6 together with FIGS. 2-4 described above. FIG. 5 is a rear perspective view of the digital camera 10. FIG. 6 is a bottom perspective view of the digital camera 10. The connector section 160 is fixed to the front chassis 181 with a screw 1811, and fixed to the side chassis 183 with a screw 1831. The battery unit 130 is fixed to the front chassis 182 with a screw 1821, and fixed to the side chassis 183 with a screw 1832, as well as with a screw 1833 from the bottom. Here, the fix with the screw 1833 is achieved in a bent part 1834 where the side chassis 183 is bent from the side face toward the bottom face.

The frame 120 is fixed to the bent part of each of the front chassis 181 and 182 with screws 1812 and 1822 at fixing sections 124 and 125 each provided in a side part near the mount receptacle section 121 (see FIGS. 2, 4, and 6; the front chassis 182 in FIG. 4 is shown in the form of a partial cross section of the bent part). Further, the frame 120 is fixed to the bottom chassis 184 with a screw 1841 at a fixing section 126 provided in a lower part (bottom) near the mount receptacle section 121 (see FIG. 6). Further, the bottom chassis 184 is fixed to the connector section 160 with a screw 1842, and to the battery unit 130 with a screw 1843. The bottom chassis 184 is further fixed to the side chassis 183 with a screw 1844 at a bent part 1835 which is formed by bending similarly to the bent part 1834 of the side chassis 183. The bottom chassis 184 is fixed with a screw 1845 to a portion (wing part) where the above-mentioned bent part of the front chassis 182 is extended toward the bottom and further bent in to parallel to the bottom. Further, the bottom chassis 184 is provided with a threaded section 1846 for tripod for attaching a tripod.

As such, the outside (periphery) of the internal structure constructed from these parts connected by the chassis and the like is provided with exterior members 190 (including switches, buttons, the external display section 12, the outer frame to which these are attached, and the like) composed of metal members, resin members, or the like and arranged in a manner surrounding the internal structure.

When the above-mentioned configuration is viewed as a joining structure of the above-mentioned various members, first, the shutter section 109 and the shake correction unit 200 are attached to the rear end of the frame 120. The front side (fixing sections 124, 125, and 126) of the frame 120 is connected to the front chassis 181 and 182 with the screws 1812 and 1822, and connected to the bottom chassis 184 with the screw 1841. Further, the connector section 160 is attached to the front chassis 181 with the screw 1811. The battery unit 130 is attached to the front chassis 182 with the screw 1821. As a result, the frame 120, the connector section 160, and the battery unit 130 are connected by the front chassis 181 and 182. Further, the connector section 160 and the battery unit 130 integrated with the control board 140 are connected by the side chassis 183 via the screw 1831 and the connection section 143 (screw 1832). The bottom chassis 184 also plays a role of connecting the frame 120 with the connector section 160 and the battery unit 130 via the screw 1842 and the screw 1843.

From the perspective of this connection structure, the digital camera 10 is generally divided into the two structures: a combined integrated structure (referred to as an integrated unit) serving as a rigid body constructed by integrating the mount section 3, the frame 120, the mirror section 103, the shutter section 109, the drive unit 150, and the shake correction unit 200; and a structure other than this integrated unit, that is, a combined integrated structure (referred to as a main body) serving as a rigid body obtained when the battery unit 130 (control board 140) and the connector section 160 are connected and integrated by the chassis (and screws for fixing these) serving as a connection section. Here, each chassis included in the main body serves also as a connection section for the integrated unit.

Since the above-mentioned joining structure for the members is adopted, even when a vibration occurs in the driving of the mirror section 103 or the shutter section 109 (the mirror section 103 needs to rotate at a high speed at the time of photographing; thus, a shock easily arises when the mirror rotates and jumps up or the mirror returns to the original position; as for the shutter section, the requirement of improvement in the shutter speed (SS) increases the easiness of occurrence of a shock in association with the opening and closing drive of the shutter blade (wing)), or alternatively even when a vibration occurs in the driving of the shake correction unit 200, the vibration is not directly transmitted to the gyroscope unit 170 attached in the gyroscope attaching section 134 of the battery unit 130. That is, the vibration generated in the above-mentioned integrated unit serving as a vibration source is bypassed by the chassis serving as the connection section between the integrated unit and the gyroscope unit 170 (in this example, bypassed by the front chassis 182, the side chassis 183, or the bottom chassis 184; may be bypassed by the front chassis 181), so that the vibration is damped (the vibrational energy is absorbed by a so-called "play" in the chassis or the screw joining sections of these chassis). This minimizes the influence on the shake detection in the gyroscope unit 170.

Further, since such a joining structure is adopted, a predetermined space part G is easily set up between the structure (unit) containing the frame 120 and the shake correction unit 200 and the structure containing the control board 140 and the battery unit 130. That is, since no joining structure section is provided between the frame 120 and the battery unit 130, and since the drive unit 150 is arranged on the connector section 160 side, a planar space is easily ensured in alignment with the side wall part 1201 of the frame 120. Thus, in the present embodiment, a space part G is set up near the above-mentioned side wall part 1201, so that the first flexible wiring board 146 is arranged in the space part G in a manner folded at a predetermined length. This allows the first flexible wiring board 146 to move and follow the swing operation of the image pickup device 101 in two dimensions (the yaw direction and the pitch direction). When the first flexible wiring board 146 is folded and arranged in the space part G, in order to avoid that the first flexible wiring board 146 contacts against the frame 120 and the internal members such as the battery unit 130 and thereby wears out, the first flexible wiring board 146 is guided (introduced) into the space part G by a bent part 2031 at the end of a heat sink 203 on the battery unit 130 side and by a support portion 147.

Figure 7:
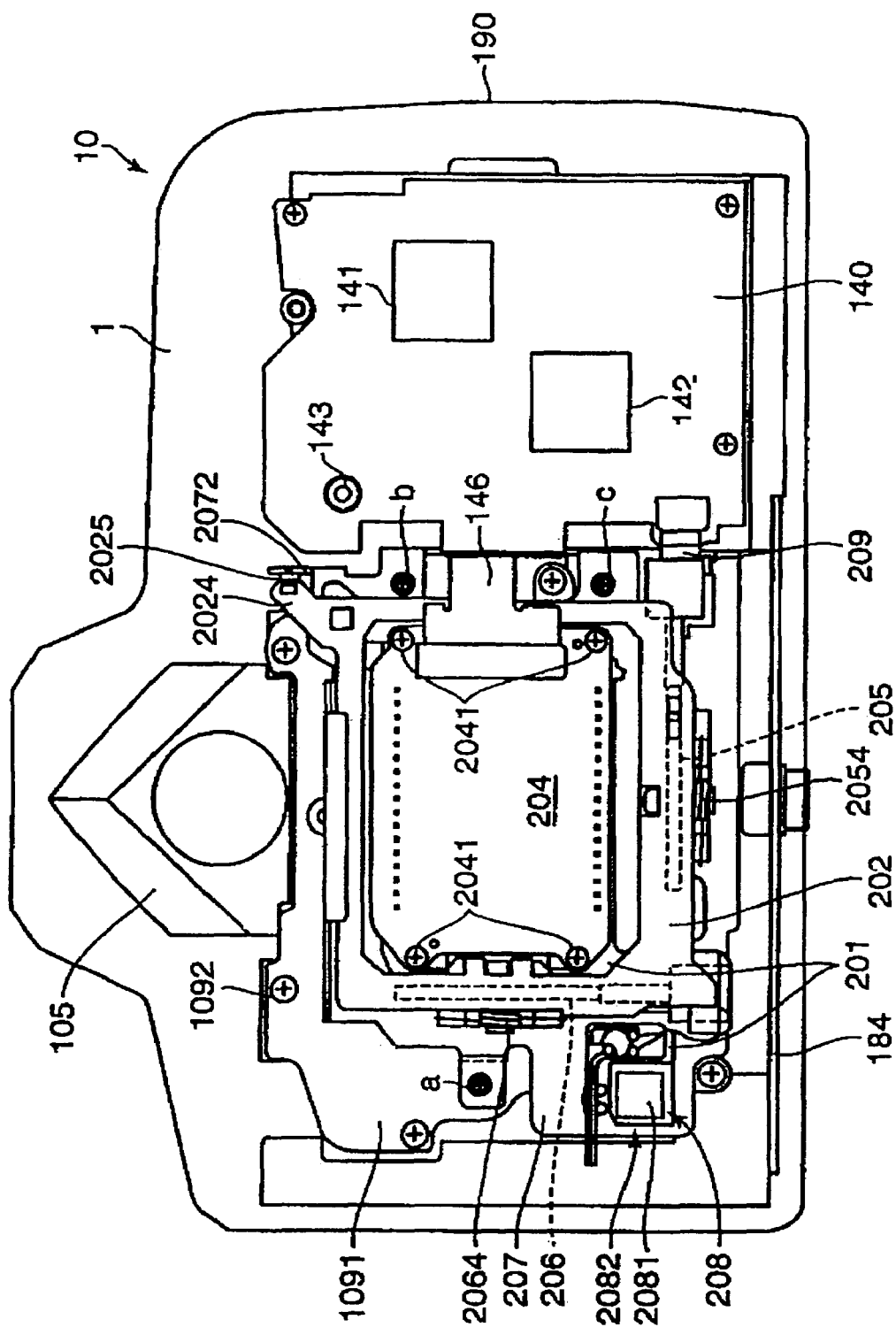
FIG. 7 is a diagram showing the rear perspective view of FIG. 5 in a state that a side chassis is removed.
Figure 8:
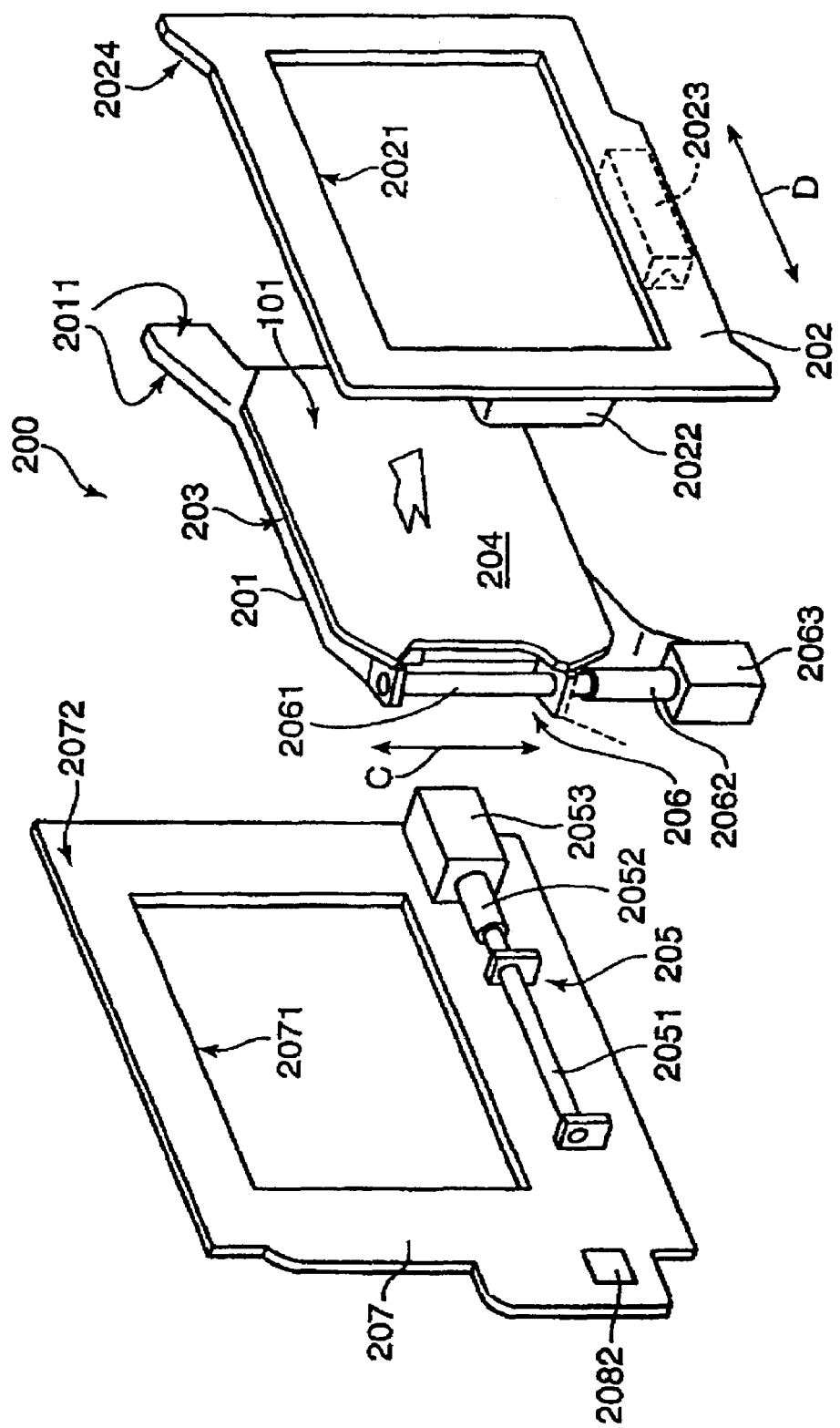
FIG. 8 is a perspective view schematically showing the configuration of a shake correction unit.

The shake correction unit 200 is described below in detail with reference to FIGS. 7 and 8 together with FIGS. 3 and 4 described above. FIG. 7 is a diagram showing the rear perspective view of FIG. 5 in a state that the side chassis 183 is removed. FIG. 8 is a perspective view schematically showing the configuration of the shake correction unit 200. The shake correction unit 200 comprise: the image pickup device 101 and the low pass filter 108; an image pickup device holder 201 for retaining the low pass filter 108 together with the image pickup device 101; a slider 202 for retaining the image pickup device holder 201; a heat sink 203 arranged behind the image pickup device 101; an image pickup device board 204 arranged behind the heat sink 203; the yaw direction actuator 205; the pitch direction actuator 206; a shake base plate 207; and a position detection sensor section 208.

The image pickup device board 204 is an approximately rectangular substrate (a CCD substrate in this example) on which the image pickup device 101 is mounted. This mounting is performed in such a manner that the heat sink 203 intervenes between the image pickup device 101 and the image pickup device board 204. The heat sink 203 is a plate-shaped member composed of a predetermined metallic material, and thereby releases the heat caused by the driving (photoelectric conversion) of the image pickup device 101. The image pickup device holder 201 is a frame which has an approximately rectangular cross section and which has openings in the front and rear faces. The low pass filter 108 is attached in the front part of the frame, while the image pickup device 101 is arranged behind the low pass filter 108. The image pickup device 101 is pressed together with the heat sink 203 against the image pickup device holder 201 by the image pickup device board 204, while the image pickup device board 204 is fixed and attached to the image pickup device holder 201 with screws 2041.

The pitch direction actuator 206 is provided in an end side part (left side part in this example) in the right and left directions of the image pickup device holder 201. The image pickup device holder 201 is attached to the slider 202 via the pitch direction actuator 206 in a manner permitting slide motion in the pitch direction (up and down directions indicated by an arrow C of FIG. 8). The slider 202 is a frame having an approximately planar shape in an approximate center of which an opening 2021 is formed in a rectangular shape larger than the image pickup device board 204. At a position of the slider 202 opposing the pitch direction actuator 206, a bearing section 2022 is fixed in which a V groove fitted with the pitch direction actuator 206 (a shank 2061 described later) in a freely slidable manner is formed, so that the above-mentioned slide motion is permitted. Further, under the slider 202, a bearing section 2023 is fixed that is constructed in correspondence to the yaw direction actuator 205 in a manner similar to the above-mentioned bearing section 2022. In the fitting of the shank 2051 (2061) into the bearing section 2022 (2023) (frictional joint described later), as shown in FIG. 7, a biasing force generated by a biasing member 2054 (2064) such as a spring causes the shank 2051 (2061) to be pinched between a pressing plate (a yaw pressing plate or a pitch pressing plate) and the bearing section 2022 (2023).

In the shake correction unit 200, the shake base plate 207 serves as a so-called base for retaining the slider 202 in a state retaining the image pickup device holder 201. The shake base plate 207 is a frame in an approximate center of which an opening 2071 is formed that has a size comparable with the opening 2021 of the slider 202 (actually, the opening 2021 of the slider 202 is slightly larger). In an end side part (lower side part in this example) of the up and down directions of the shake base plate 207, the yaw direction actuator 205 is fixed, while the slider 202 is attached to the shake base plate 207 in such a manner that slide motion is permitted in the yaw direction (right and left directions indicated by an arrow D of FIG. 8) in a state that the bearing section 2023 of the slider 202 is fitted with the yaw direction actuator 205 (a shank 2051 described later) in a freely slidable manner.

The upper right corner part 2072 of the shake base plate 207 is connected to the corner part 2024 in a state that the corner part of the image pickup device holder 201 is biased by a biasing member such as a spring such that the corner part 2024 of the slider 202 should be pressed against the corner part 2072 in a state that a ball is loosely fitted between the two side surfaces 2011 of the corner part. Thus, the slide motion of the slider 202 (image pickup device holder 201) in the yaw direction and the slide motion of the image pickup device holder 201 in the pitch direction are permitted, while the slider 202 is pressed together with the image pickup device holder 201 against the shake base plate 207, so that these are reliably retained and prevented from separating from the shake base plate 207. As shown in FIG. 4, the shake base plate 207 is fixed to the shutter pressing plate 1091 in a state so-called floated by screws 2074 via a compression spring 2073 at three positions indicated by numerals a, b, and c of FIGS. 7 and 8. The degree of tightening the screws 2074 permits the adjustment of the inclination (tilt adjustment) in the pitch direction and the yaw direction relative to the shake base plate 207 of the image pickup device 101.

The position detection sensor section 208 detects the position of the image pickup device 101 at the time of shake correction drive or camera startup. The position detection sensor section 208 comprises a magnet section 2081 and a two-dimensional Hall sensor 2082. The magnet section 2081 is an element for generating a magnetic force lines (magnetic force is intense especially at the center), and provided in (a corner part of) the image pickup device holder 201 (see FIG. 7) so as to move in a manner integrated with the image pickup device holder 201. The two-dimensional Hall sensor 2082 is a sensor in which a predetermined number (four, in this example) of Hall elements are arranged in two dimensions. Each Hall element outputs a signal corresponding to the intensity of the magnetic force lines generated by the magnet section 2081. The two-dimensional Hall sensor 2082 is arranged at a position of the shake base plate 207 opposite the magnet section 2081, so that the position is fixed (see FIG. 8). In the position detection sensor section 208, the position of the magnet section 2081 traveling in association with the motion of the image pickup device holder 201 in the up, down, right, and left directions relative to the shake base plate 207 is detected by the two-dimensional Hall sensor 2082, so that the position of the image pickup device 101 is detected. The position detection sensor section 208 is electrically connected together with the yaw direction actuator 205 and the pitch direction actuator 206 to the control board 140 through a second flexible wiring board 209.

Each of the yaw direction actuator 205 and the pitch direction actuator 206 is a linear actuator (piezoelectric actuator) of impact type in which so-called ultrasonic drive is performed. Each actuator comprises a shank 2051 or 2061, a piezoelectric element section 2052 or 2062, and a weight section 2053 or 2063. The shank 2051 or 2061 is a rod-shaped driving shank having a predetermined cross section (such as a circle) which is oscillation-driven by the piezoelectric element section 2052 or 2062. Frictional coupling is formed between the shank 2051 or 2061 and (the V-groove of) the above-mentioned bearing section 2023 or 2022.

The piezoelectric element section 2052 (2062) is composed of ceramics or the like, and then expands and contracts in response to an applied voltage so as to generate a vibration in the shank 2051 (2061) in response to these expansion and contraction.

In the expansion and contraction in the piezoelectric element section 2052 (2062), high-speed expansion and low-speed contraction, or low-speed expansion and high-speed contraction, or the same speed expansion and contraction where the expansion speed and the contraction speed are the same are repeated. The piezoelectric element section 2052 (2062) is composed a the laminated type piezoelectric element or the like, and fixed at an end of the shank 2051 (2061) in a state that the direction of polarization aligns with the axis of the shank 2051 (2061).

The electrode section of the piezoelectric element section 2052 (2062) is connected to a signal line from the control board 140 (shake correction circuit 142), while the piezoelectric element section 2052 (2062) is charged or discharged (changed in the opposite direction) in response to the driving signal from the control board 140, so that the above-mentioned expansion and contraction is performed. When the piezoelectric element section 2052 (2062) repeats the expansion and contraction as described here, the bearing sections 2023, that is, the slider 202, moves forward and backward relative to the shank 2051 (or the shank 2061 moves relative to the bearing section 2022, that is, to the slider 202), or alternatively stops at a position. At an end of the shank 2051 (2061) opposite to the piezoelectric element section 2052 (2062), the weight section 2053 (2063), that is, a weight, is fixed for ensuring that the vibration generated by the piezoelectric element section 2052 (2062) should be efficiently transmitted to the shank 2051 (2061).

As such, when the slider 202 and the image pickup device holder 201 slide in an integrated manner in the right and left directions relative to the shake base plate 207 in response to the driving of the yaw direction actuator 205, the shake of the image pickup device 101 in the yaw direction (arrow D direction) is corrected. Further, when the image pickup device holder 201 slides in the up and down directions relative to the slider 202 in response to the driving of the pitch direction actuator 206, the shake of the image pickup device 101 in the pitch direction (arrow C direction) is corrected.

(Description of Electrical Configuration of Imaging Apparatus)

Figure 9:
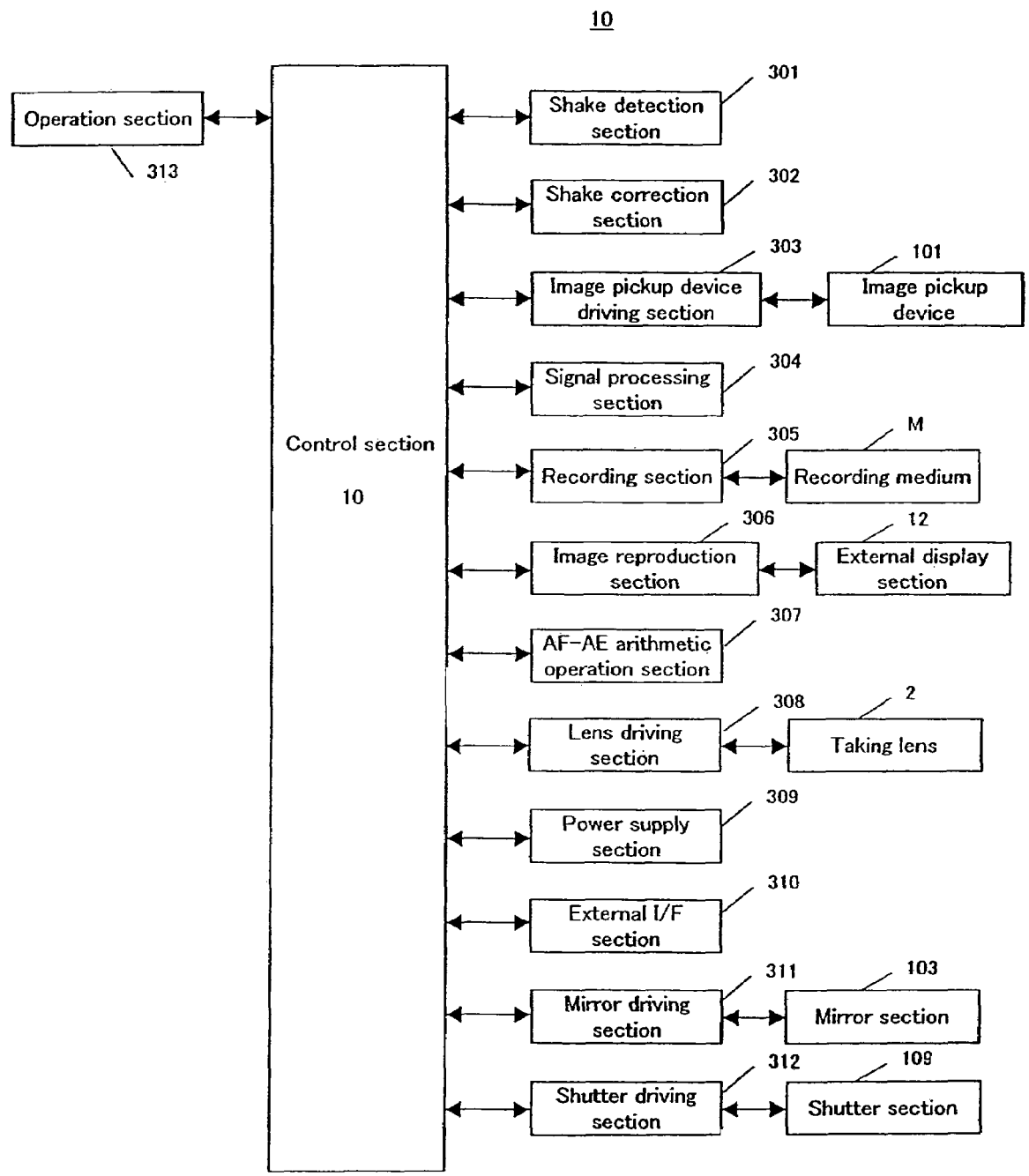
FIG. 9 is a block diagram showing the electrical configuration of a digital camera.

FIG. 9 is a block diagram showing the electrical configuration of the digital camera 10. As shown in FIG. 9, the digital camera 10 comprises a system control section 100, a shake detection section 301, a shake correction section 302, an image pickup device driving section 303, a signal processing section 304, a recording section 305, an image reproduction section 306, an AF/AE arithmetic operation section 307, a lens driving section 308, a power supply section 309, an external I/F section 310, a mirror driving section 311, a shutter driving section 312, and an operation section 313. The system control section 100 comprises: a ROM (Read Only Memory) for storing control programs or the like; a RAM (Random Access Memory) for temporarily storing data for arithmetic operation, control processing, or the like; and a CPU (Central Processing Unit) for reading and executing the above-mentioned control programs or the like from the ROM. Thus, the system control section 100 controls the operation of each part of the digital camera 10 in response to various signals received from the shake detection section 301, the operation section 313, the driving section, or the like.

The shake detection section 301 is composed of the gyroscope unit 170, and detects a shake (camera shake) of the digital camera 10. The shake correction section 302 is composed of the shake correction unit 200, and drives the yaw direction actuator 205 and the pitch direction actuator 206 on the basis of the shake information detected by the shake detection section 301 and the position information of the image pickup device 101 detected by the position detection sensor section 208 so as to perform the shake correction.

The image pickup device driving section 303 controls the photoelectric conversion of the image pickup device 101 (CCD), and performs predetermined analog processing such as Gain (amplification) on the output signal of the image pickup device 101. Specifically, a timing generator provided in the image pickup device driving section 303 outputs a driving control signal to the image pickup device 101, so that exposure to the object light is performed for a predetermined time. Then, a converted image signal is obtained. After that, the image signal undergoes gain change, and then is transmitted to the signal processing section 304.

The signal processing section 304 performs predetermined analog signal processing and predetermined digital signal processing on the image signal transmitted from the image pickup device 101. The signal processing section 304 comprises: a CDS (correlation double sampling) circuit for reducing the sampling noise of the image signal; and an AGC (automatic gain control) circuit for performing level adjustment of the image signal. The signal processing section 304 further comprises: an analog signal processing circuit for performing predetermined analog signal processing on the image signal of analog value outputted from the image pickup device 101; an A/D conversion circuit for converting into an image signal of digital value the image signal outputted from the analog signal processing circuit; an interpolation circuit for performing pixel interpolation on the A/D-converted pixel data; a black level correction circuit for correcting the black level of each A/D-converted pixel data into a reference black level; a white balance (WB) circuit for adjusting the white balance of the image; a γ correction circuit for correcting the γ property of the pixel data and thereby performing gray level correction; and an image memory for temporarily storing the image data having undergone the signal processing.

The recording section 305 records the generated image data into a recording medium M (such as a memory card) capable of being detached and attached, and reads the image data recorded in the recording medium. The image reproduction section 306 processes the image data generated by the signal processing section 304 or alternatively the image data read from the recording medium by the recording section 305, and thereby generates image data appropriate for the display in the external display section 12.

The AF-AE arithmetic operation section 307 performs operation for the automatic focusing control (AF) and the automatic exposure control (AE). The lens driving section 308 controls the driving of the lens group 21 of the taking lens 2. Here, the taking lens 2 comprises: a focus lens; a zoom lens; and a diaphragm for adjusting the amount of transmitted light, and further comprises a lens ROM for storing information specific to the lens (information such as the open F value and the focal length). The lens ROM is connected to the system control section 100 via an electrical contact.

The power supply section 309 is composed of a battery unit 130, and supplies power to each part of the digital camera 10. The external I/F section 310 is composed of a connector section 160 provided with a holder for a remote terminal or a USB terminal or with a jack for an AC power supply or the like, and serves as an I/F (interface) with an external device.

The mirror driving section 311 drives the mirror section 103 (the main mirror 1031 and the sub-mirror 1032). In response to a retraction signal inputted from the system control section 100, the mirror driving section 311 causes the main mirror 1031 to rotate and retract together with the sub-mirror 1032 from the optical axis L of the taking lens 2. The retraction signal is generated by the system control section 100 when an ON signal of the release button 7 is inputted to the system control section 100. On completion of the photographing, the mirror driving section 311 causes the mirror section 103 in the retracted state to rotate and return to the original position on the optical axis L. The shutter driving section 312 drives (the opening and closing of) the shutter section 109. The operation section 313 comprises operating members such as a mode setting dial 6, a direction selection key 14, and a camera shake correction switch 15, and receives instruction input generated by an operation of the user.

As described above, according to the imaging apparatus (digital camera 10) of the present embodiment, the gyroscope unit 170 is attached to a separate member (a structure other than the integrated unit constructed by integrating the mount section 3, the frame 120, the mirror section 103, the shutter section 109, the drive unit 150, and the shake correction unit 200; that is, the main body constructed by integrating the battery unit 130 (control board 140) and the connector section 160 via the connection section; the battery unit 130 in this example) arranged separate from the frame 120 that retains the mirror section 103 and hence receives the direct vibration of the drive of the mirror section 103 (the frame 120 that retains the shutter section 109 and hence receives the direct vibration of the drive of the shutter section 109; the retaining member) but via the connection section (the front, side, bottom chassis 181, 182, 183, and 184, and the screws for fixing these). This avoids that the vibration caused by the driving of the mirror section 103 (shutter section 109) is directly transmitted to the gyroscope unit 170. That is, the vibration is bypassed and damped along the route going through the connection section. This minimizes the influence on the shake detection in the gyroscope unit 170. As a result, a clear photographed image is obtained on the basis of the shake correction.

Further, the gyroscope unit 170 is provided in a separate member (for example, the battery unit 130 of the main body) via the buffer material 173. Thus, the drive vibration of the apparatus (vibration caused by the driving of the mirror section 103, the shutter section 109, or the shake correction unit 200) is further damped in the buffer member 173. This suppresses more reliably the influence of the vibration on the shake detection in the gyroscope unit 170.

Further, the buffer member 173 is composed of a sheet shaped rubber material. This permits such an easy attaching method that the gyroscope unit 170 is adhered to the separate member (for example, the battery unit 130 of the main body) by using the two sides of the sheet. Further, this avoids the necessity of a special structure for absorbing the vibration, and permits the use of the buffer member 173 having a simple configuration.

According to this configuration, the image pickup device 101 is provided in the frame 120 in the form of a shake correction unit 200 that allows the image pickup device 101 to move in a direction perpendicular to the optical axis L and thereby permits the shake correction. This avoids that a vibration caused by the driving of the shake correction unit 200 is directly transmitted to the gyroscope unit 170. That is, the vibration is bypassed and damped along a route going through the connection section. This minimizes the influence of the vibration on the shake detection in the gyroscope unit 170.

The connection section is composed of the chassis (the front chassis 181 and 182, the side chassis 183, and the bottom chassis 184) and the screws for connecting the frame 120 with the separate member (battery unit 130) by screw joining. This damps the vibration, and realizes a simple configuration that allow the frame 120 to be reliably connected and fixed to the separate member.

Further, the separate member is the battery unit 130 fixed to the frame 120 by the connection section in a manner separated with a predetermined space (space part G). This separation from the frame 120 with a space avoids that the vibration is transmitted to the separate member (battery unit 130) to which the gyroscope unit 170 is attached, via a route (for example, the part in contact with the frame 120) other than the route going through the connection section. Further, the separate member is a unit serving as the battery accommodating section, and hence the separate member generates no vibration. This suppresses more reliably the influence of the vibration on the shake detection in the gyroscope unit 170.

Figure 10:
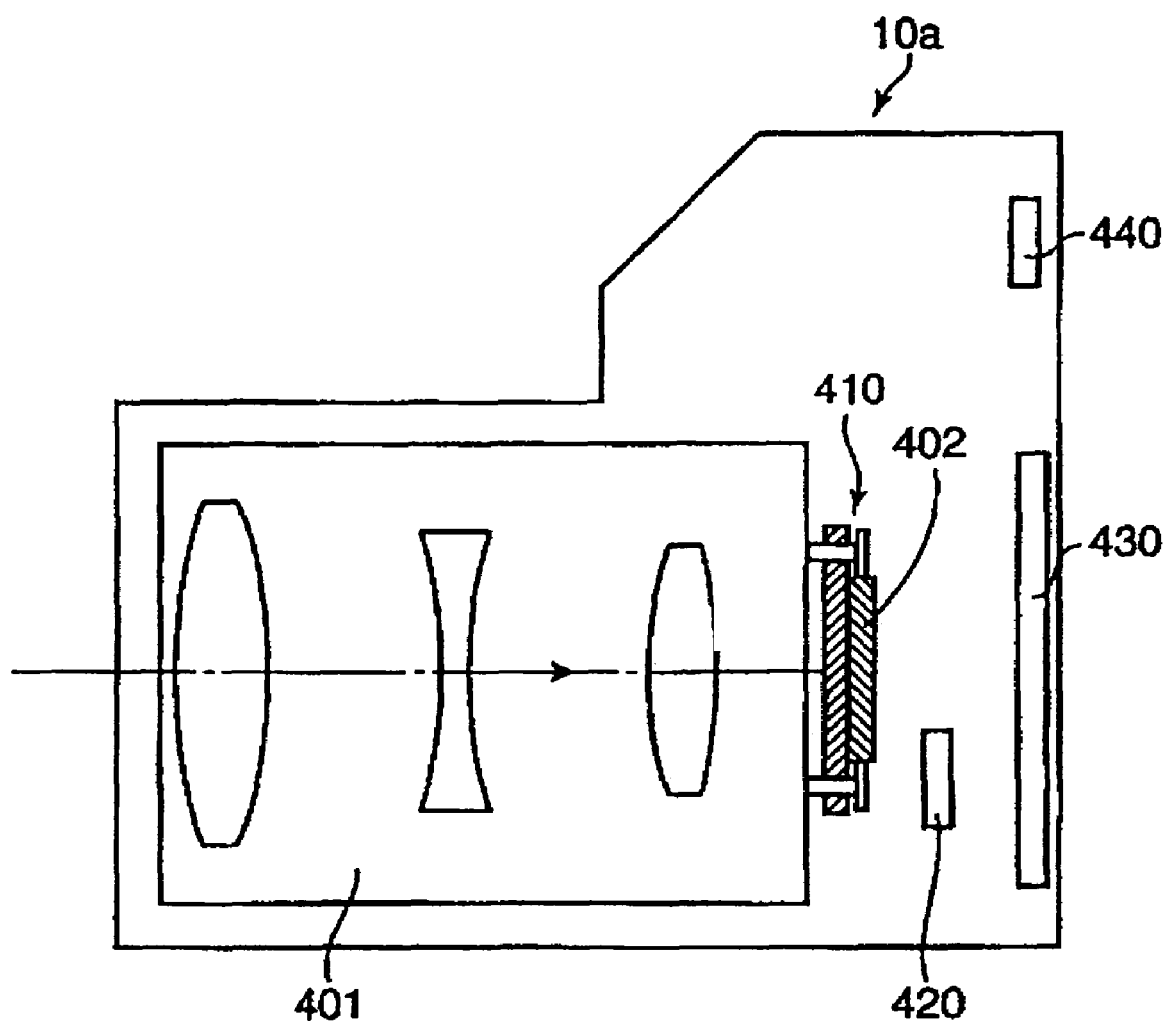
FIG. 10 is a diagram showing a modification of the above-mentioned digital camera.

The invention can employ the following modes. (A) The camera to which the invention is applied is not limited to the above-mentioned digital camera 10. A camera of any type may be used as long as the shake detection section (gyroscope unit) for detecting a shake is provided in a member (separate member) provided separately from a unit (unit provided with a shutter section, a mirror section, or a shake correction unit: the integrated unit in the above-mentioned example) serving as a source of drive vibration via a predetermined connection section (such as a chassis and a screw). Specifically, in this case, for example, as shown in the schematic sectional view of FIG. 10, a digital camera 10a not having a mirror section (that is, a camera not of single lens reflex type) may be used in which a fixed taking lens 401 (not an interchangeable lens) is provided in the main body, while a shake correction unit 410 for performing the shake correction drive for an image pickup device 402 is arranged behind the taking lens 401 on the optical axis.

However, also in the digital camera 10a, similarly to the digital camera 10, the gyroscope unit 420 is attached to the battery unit which is attached indirectly to the frame directly receiving the vibration generated in the shake correction drive or the like for the shake correction unit 410 (no vibration is generated in association with the driving of a mirror section because of the absence of a mirror section), via the connection section (the chassis and the screws for fixing this). This avoids that the vibration caused by the shake correction unit 410 or the like is directly transmitted to the gyroscope unit 420. That is, the vibration is bypassed and damped along the route going through the connection section. This minimizes the influence on the shake detection in the gyroscope unit 420. Here, the digital camera 10a may comprise no shutter section (mechanical shutter) but an electronic shutter implemented by the image pickup device 402 (if a shutter section were provided, the shutter section could serve as a vibration source). Further, an external display section 430 (liquid crystal display monitor) as well as an EVF 440 (Electronic View Finder) may be provided.

(B) The gyroscope unit 170 (shake detection section) is not limited to being provided in the battery unit 130. That is, similarly to the digital camera 10 (10*a*), when the structure inside the camera is generally divided into: a unit provided with driving sections serving as a vibration source; and a unit (main body) which is composed of the other structures connected by a connection section and hence does not serve as a vibration source, the arrangement of these structures in the main body may differ from the above-mentioned examples. For example, the connector section 160 or other members (not serving as a vibration source) may be arranged at the position of the battery unit 130, while the gyroscope unit 170 may be attached to that position.

As described above, an imaging apparatus of the invention comprises: an image pickup device for picking up object light; a mirror section for switching an optical path of the object light; a retaining member for retaining at least the mirror section; and a shake detection section for detecting a shake of the image pickup device, wherein the shake detection section is provided in a member separate from but indirectly connected to the retaining member via a predetermined connection section. The shake detection section is attached to the separate member connected indirectly to the retaining member that retains the mirror section and hence receives directly a vibration at the time of driving of the mirror section, with the intervention of the connection section. This avoids that the vibration caused by the driving of the mirror section is directly transmitted to the shake detection section. That is, the vibration is bypassed and damped along a route going through the connection section. This minimizes the influence on the shake detection in the shake detection section. As a result, a clear photographed image is obtained on the basis of the shake correction.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An imaging apparatus, comprising:
an image pickup device for picking up object light;
a mirror section for switching an optical path of the object light;
retaining member for retaining at least the mirror section; and
shake detection section for detecting a shake of the image pickup device, wherein the shake detection section is provided in a member separate from but indirectly connected to the retaining member via a predetermined connection section, wherein the shake detection section is provided in the separate member via a predetermined buffer member.

2. An imaging apparatus according to claim 1, wherein the buffer member is composed of a sheet shaped rubber material.

3. An imaging apparatus according to claim 1, wherein the image pickup device is provided in the retaining member in the form of a shake correction unit that allows the image pickup device to move in a direction perpendicular to the optical axis and thereby permits the shake correction.

4. An imaging apparatus according to claim 1, wherein the connection section is composed of a chassis and a screw for connecting the retaining member with the separate member by screw joining.

5. An imaging apparatus according to claim 1, wherein the separate member is a battery unit fixed to the retaining member with predetermined spacing via a connection section.

6. An imaging apparatus, comprising:
an image pickup device for picking up object light;
a shutter section for adjusting an exposure time for the image pickup device;
a retaining member for retaining at least the shutter section; and
a shake detection section for detecting a shake of the image pickup device, wherein the shake detection section is provided in a member separate from but indirectly connected to the retaining member via a predetermined connection section, wherein the shake detection section is provided in the separate member via a predetermined buffer member.

7. An imaging apparatus according to claim 6, wherein the buffer member is composed of a sheet shaped rubber material.

8. An imaging apparatus according to claim 6, wherein the image pickup device is provided in the retaining member in the form of a shake correction unit that allows the image pickup device to move in a direction perpendicular to the optical axis and thereby permits the shake correction.

9. An imaging apparatus according to claim 6, wherein the connection section is composed of a chassis and a screw for connecting the retaining member with the separate member by screw joining.

10. An imaging apparatus according to claim 6, wherein the separate member is a battery unit fixed to the retaining member with predetermined spacing via a connection section.

11. An imaging apparatus, comprising:
an image pickup device for picking up object light;
an image pickup function section for generating a mechanical vibration depending on the image pickup operation;
an image pickup function section retaining member for retaining at least the image pickup function section;
a shake detection section for detecting a shake of the image pickup device; a shake detection section retaining member for retaining the shake detection section; and
a connection section for connecting the image pickup function section retaining member with the shake detection section retaining member, wherein the shake detection section is provided in the separate member via a predetermined buffer member.

12. An imaging apparatus according to claim 11, wherein the image pickup function section is a mirror section for switching an optical path of the object light.

13. An imaging apparatus according to claim 11, wherein the image pickup function section is a shutter section for adjusting an exposure time for the image pickup device.

14. An imaging apparatus according to claim 11, wherein the buffer member is composed of a sheet shaped rubber material.

15. An imaging apparatus according to claim 11, wherein the image pickup device is provided in the retaining member in the form of a shake correction unit that allows the image pickup device to move in a direction perpendicular to the optical axis and thereby permits the shake correction.

16. An imaging apparatus according to claim 11, wherein the connection section is composed of a chassis and a screw for connecting the retaining member with the separate member by screw joining.

* * * * *